(12) United States Patent
Harvey et al.

(10) Patent No.: US 11,176,562 B1
(45) Date of Patent: Nov. 16, 2021

(54) SYSTEM AND METHODS FOR PREDICTING RENTAL VEHICLE USE PREFERENCES

(71) Applicant: STATE FARM MUTUAL AUTOMOBILE INSURANCE COMPANY, Bloomington, IL (US)

(72) Inventors: Brian N. Harvey, Bloomington, IL (US); Joseph Robert Brannan, Bloomington, IL (US); J. Lynn Wilson, Normal, IL (US); Matthew Eric Riley, Sr., Heyworth, IL (US); Ryan Gross, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 207 days.

(21) Appl. No.: 16/266,986

(22) Filed: Feb. 4, 2019

(51) Int. Cl.
*G06Q 30/02* (2012.01)
*G06Q 50/30* (2012.01)
*G06Q 30/06* (2012.01)

(52) U.S. Cl.
CPC ..... *G06Q 30/0202* (2013.01); *G06Q 30/0645* (2013.01); *G06Q 50/30* (2013.01)

(58) Field of Classification Search
USPC .......................................................... 705/7
See application file for complete search history.

(56) References Cited

U.S. PATENT DOCUMENTS

| | | | |
|---|---|---|---|
| 7,996,282 B1 * | 8/2011 | Scott | G06Q 30/0641 705/27.2 |
| 9,087,099 B2 | 7/2015 | Camacho et al. | |
| 10,013,697 B1 | 7/2018 | Cote et al. | |
| 10,026,237 B1 | 7/2018 | Fields et al. | |
| 10,810,504 B1 | 10/2020 | Fields et al. | |
| 10,831,859 B2 | 11/2020 | Van Wiemeersch et al. | |

(Continued)

FOREIGN PATENT DOCUMENTS

WO WO-2017142536 A1 8/2017

OTHER PUBLICATIONS

Dewei Yi, Jinya Su, Cunjia Liu, Mohammed Quddus, Wen-Hua Chen, A machine learning based personalized system for driving state recognition, Transportation Research Part C: Emerging Technologies, vol. 105, (Year: 2019).*

(Continued)

*Primary Examiner* — Arif Ullah
(74) *Attorney, Agent, or Firm* — Lee & Hayes, P.C.

(57) ABSTRACT

Embodiments described herein generate a first set of prompts, the first set of prompts configured to prompt a vehicle owner for a first set of answers used to learn preferred vehicle renter characteristics; receive the first set of answers; generate, based upon the first set of answers, a second set of prompts, the second set of prompts configured to prompt the owner for a second set of answers used to learn additional preferred vehicle renter characteristics; receive the second set of answers; predict user preference value(s) of a profile of the owner based upon the second set of answers, wherein the user preference value(s) define criteria for sharing a vehicle associated with the profile with vehicle renters who satisfy the criteria; apply the criteria to potential vehicle renters; and cause an indication of the vehicle to be displayed only to the potential vehicle renters who satisfy the criteria.

16 Claims, 7 Drawing Sheets

(56) References Cited

U.S. PATENT DOCUMENTS

| | | | |
|---|---|---|---|
| 2009/0254971 A1* | 10/2009 | Herz | G06Q 30/0603 |
| | | | 726/1 |
| 2010/0287030 A1* | 11/2010 | Sinha | G06Q 30/0609 |
| | | | 705/26.5 |
| 2011/0288891 A1 | 11/2011 | Zaid et al. | |
| 2012/0330696 A1* | 12/2012 | Clark | G08G 1/205 |
| | | | 705/5 |
| 2013/0325521 A1 | 12/2013 | Jameel et al. | |
| 2015/0120489 A1* | 4/2015 | Edelman | G06Q 30/0639 |
| | | | 705/26.4 |
| 2015/0213420 A1 | 7/2015 | Krishnamurthy et al. | |
| 2015/0371153 A1* | 12/2015 | Lohmeier | G06Q 40/025 |
| | | | 705/5 |
| 2016/0071177 A1* | 3/2016 | Launay | G06Q 30/0611 |
| | | | 705/26.4 |
| 2017/0098231 A1 | 4/2017 | Dietrich | |
| 2017/0144671 A1 | 5/2017 | Memani et al. | |
| 2017/0206717 A1 | 7/2017 | Kuhnapfel | |
| 2018/0053133 A1* | 2/2018 | Maheshwari | G06Q 10/06315 |
| 2018/0075380 A1 | 3/2018 | Perl et al. | |
| 2020/0164891 A1 | 5/2020 | Bender et al. | |

OTHER PUBLICATIONS

Non Final Office Action dated Jan. 6, 2021 for U.S. Appl. No. 16/267,023, "System and Methods for Determining Rental Eligibility Based On Contextual Telematics Data", Harvey, 12 pages.

Office Action dated Jan. 7, 2021 for U.S. Appl. No. 16/266,879, "Incentivizing and/or Penalizing Vehicle Renters Based on Telematics Data", Harvey, 14 pages.

Griffiths, "Telematics is revolutionising fleet management", Connected Car, Financial Times. 1-4 (2016).

Hampshire et al., "Market Analysis and Potential Growth", Peer-to-Peer Carsharing, Transportation Research Record Journal of the Transportation Research Board. 119-126 (2011).

Goodwin, "OECD International Transport Forum, Leipzig, May 2008 Transport and Energy: The Challenge of Climate Change", Policy Incentives to Change Behaviour in Passenger Transport, The Centre for Transport & Society. 1-34 (2008).

Kantor, "Design of Algorithms for Payment Telematics Systems Evaluating Driver's Driving Style", Transactions of Transport Sciences, 7:9-16 (2014).

Mortimer, "The effect of 'smart' financial incentives on driving behaviour of novice drivers", Accident Analysis and Prevention, 119:68-79 (2018).

\* cited by examiner

200

202
SELECT PREFERRED VEHICLE RENTER CHARACTERISTICS.
☐ PREVIOUS DRIVING HISTORY
☒ DURATION OF VEHICLE RENTAL
☒ YEARS OF DRIVING EXPERIENCE
☐ OTHER

204
WOULD YOU LIKE TO RENT OUT YOUR VEHICLE FOR MORE THAN A WEEK?
☐ YES
☒ NO

206
WOULD YOU RENT YOUR VEHICLE OUT TO A DRIVER LESS THAN 21 YEARS OF AGE?
☐ YES
☒ NO

212
SELECT PREFERRED VEHICLE RENTER CHARACTERISTICS.
☒ PREVIOUS DRIVING HISTORY
☐ DURATION OF VEHICLE RENTAL
☐ YEARS OF DRIVING EXPERIENCE
☐ OTHER

214
PLEASE SELECT QUALITIES OF PREVIOUS DRIVING HISTORY THAT ARE IMPORTANT TO YOU
☒ SPEEDING VIOLATIONS
☒ NUMBER OF ACCIDENTS
☐ URBAN CITY DRIVING

FIG. 2B

SYSTEM AND METHODS FOR PREDICTING RENTAL VEHICLE USE PREFERENCES

FIELD OF THE DISCLOSURE

The present disclosure relates to vehicle renting/sharing, and, more particularly, to predicting preferences of a vehicle owner using customized prompts.

BACKGROUND

A peer-to-peer (P2P) car sharing model enables vehicle owners to rent their vehicles to others for short periods of time. Participating vehicle owners typically charge a fee to rent out their vehicles, and participating renters drive the vehicles and pay for the time they need to use them. The participating owners and renters may use a common vehicle-sharing platform, which may be in the form of a website or mobile application, to manage the scheduling of and payment for the vehicles.

Typically, a participating vehicle owner may use the vehicle-sharing platform to i) describe their vehicle(s), such as the make and model, that are available for rent, ii) set a location for pickup and return of the vehicle(s), and iii) mark available days of the week that their vehicle(s) are available for rent. Participating renters may access the vehicle-sharing platform to search for a vehicle to rent according to their criteria, such as the time period they will need to drive the vehicle, the type of desired vehicle, price, etc. The success of such a vehicle-sharing platform often depends on a sense of trust between the participating vehicle owners and renters. To build trust, vehicle-sharing platforms typically require the participating vehicle owners and renters to verify their identities, such as by entering in their license number and credit card information. Vehicle-sharing platforms may also set general expectations that apply to all participating renters, such as a no smoking policy in the vehicle.

Despite the high-level trust mechanisms mentioned above that are already in place, conventional vehicle-sharing platforms lack low-level trust mechanisms. For example, participating vehicle owners are unable to set personal preferences to allow only a subset of the verified participating renters to rent their vehicles. In one scenario, although all verified participating renters have approved driving histories, participating vehicle owners may only trust participating renters that have a higher standard of driving etiquette. Existing vehicle-sharing platforms simply do not include a means for generating and enforcing personal preferences onto participating renters.

Additional challenges in designing a means for generating and enforcing personal preferences are two-fold. First, participating vehicle owners may desire to place varying levels of importance on various aspects of participating renters, which increases the difficulty in designing a standardized means for identifying personal preferences for all participating vehicle owners. For example, one may place more importance on how long participating renters want to rent a vehicle (e.g., only a few hours as opposed to entire days), whereas another may place more importance on how many accidents the participating renters have been involved in.

Second, given the ubiquitous nature of mobile devices (e.g., smartphones), participating vehicle owners and renters may desire to access vehicle-sharing platforms on their mobile devices that have small screens, which increases the difficulty in designing an interface for a user (e.g., participating vehicle owner). Mobile devices with small screens tend to need data and functionality divided into many layers or views, but as the number of layers or views increases, the efficiency and usability of the user interface decreases. Designing such an interface for mobile devices is therefore a complex human factors problem, especially for mobile devices. The technical problem of effectively designing an interface of a vehicle-sharing platform to enable all participating vehicle owners to identify personalized preferences has to date been inadequately addressed, if at all.

BRIEF SUMMARY

In one aspect, a computer-implemented method of predicting a user preference may include: (1) generating, by one or more processors, a first set of prompts for display via a vehicle-sharing application, wherein the first set of prompts is configured to prompt a vehicle owner for a first set of answers used to learn preferred vehicle renter characteristics; (2) receiving, by the one or more processors, the first set of answers to the first set of prompts from the vehicle owner via the vehicle-sharing application; (3) generating, by the one or more processors and based upon the first set of answers, a second set of prompts for display via the vehicle-sharing application, wherein the second set of prompts is configured to prompt the vehicle owner for a second set of answers used to learn additional preferred vehicle renter characteristics; (4) receiving, by the one or more processors, the second set of answers to the second set of prompts from the vehicle owner via the vehicle-sharing application; (5) predicting, by the one or more processors, one or more user preference values of a vehicle-sharing platform profile of the vehicle owner based upon the second set of answers, wherein the one or more user preference values define one or more criteria for sharing a vehicle associated with the vehicle-sharing platform profile with vehicle renters who meet the one or more criteria; (6) applying, by the one or more processors, the one or more criteria to potential vehicle renters; and (7) causing, by the one or more processors, an indication of the vehicle of the vehicle owner to be displayed only to the potential vehicle renters who satisfy the one or more criteria.

In another aspect, a non-transitory, tangible computer-readable medium storing machine-readable instructions that, when executed by one or more processors, may cause the one or more processors to: (1) generate a first set of prompts for display via a vehicle-sharing application, wherein the first set of prompts is configured to prompt a vehicle owner for a first set of answers used to learn preferred vehicle renter characteristics; (2) receive the first set of answers to the first set of prompts from the vehicle owner via the vehicle-sharing application; (3) generate, based upon the first set of answers, a second set of prompts for display via the vehicle-sharing application, wherein the second set of prompts is configured to prompt the vehicle owner for a second set of answers used to learn additional preferred vehicle renter characteristics; (4) receive the second set of answers to the second set of prompts from the vehicle owner via the vehicle-sharing application; (5) predict one or more user preference values of a vehicle-sharing platform profile of the vehicle owner based upon the second set of answers, wherein the one or more user preference values define one or more criteria for sharing a vehicle associated with the vehicle-sharing platform profile with vehicle renters who meet the one or more criteria; (6) apply the one or more criteria to potential vehicle renters; and (7) cause an indication of the vehicle of the vehicle owner to be displayed only to the potential vehicle renters who satisfy the one or more criteria.

BRIEF DESCRIPTION OF THE DRAWINGS

The figures described below depict various aspects of the system and methods disclosed herein. It should be understood that each figure depicts an aspect of a particular aspect of the disclosed system and methods, and that each of the figures is intended to accord with a possible aspect thereof. Further, wherever possible, the following description refers to the reference numerals included in the following figures, in which features depicted in multiple figures are designated with consistent reference numerals.

FIGS. 2A-2B illustrate exemplary prompt windows in accordance with one aspect of the present disclosure;

Although the following text sets forth a detailed description of numerous different aspects, it should be understood that the legal scope of the description is defined by the words of the claims set forth at the end of this patent. The detailed description is to be construed as exemplary only and does not describe every possible aspect since describing every possible aspect would be impractical, if not impossible. Numerous alternative aspects may be implemented, using either current technology or technology developed after the filing date of this patent, which would still fall within the scope of the claims.

DETAILED DESCRIPTION

Generally, a method, apparatus, systems, and non-transitory media are described that may, inter alia, automatically predict a vehicle owner's rental vehicle use preferences to define prospective renters' eligibility requirements for sharing the owner's vehicle with the potential vehicle renters who meet the eligibility requirements. A vehicle-sharing platform performs a novel dynamic setup process to automatically predict the preferences, wherein the platform prompts the vehicle owner with a series of questions and each subsequent prompt/question is based upon the vehicle owner's response to the previous question. Advantageously, the dynamic setup process customizes questions tailored to the vehicle owner to expedite and/or simplify a user's interaction with the prompts. Once the preferences have been predicted, the preferences may be displayed to the vehicle owner, and the vehicle owner may manually modify the preferences if necessary. Only prospective renters satisfying the criteria that correspond to those preferences may be eligible to rent the owner's vehicle.

Exemplary Vehicle-Sharing Platform

Figure 1:
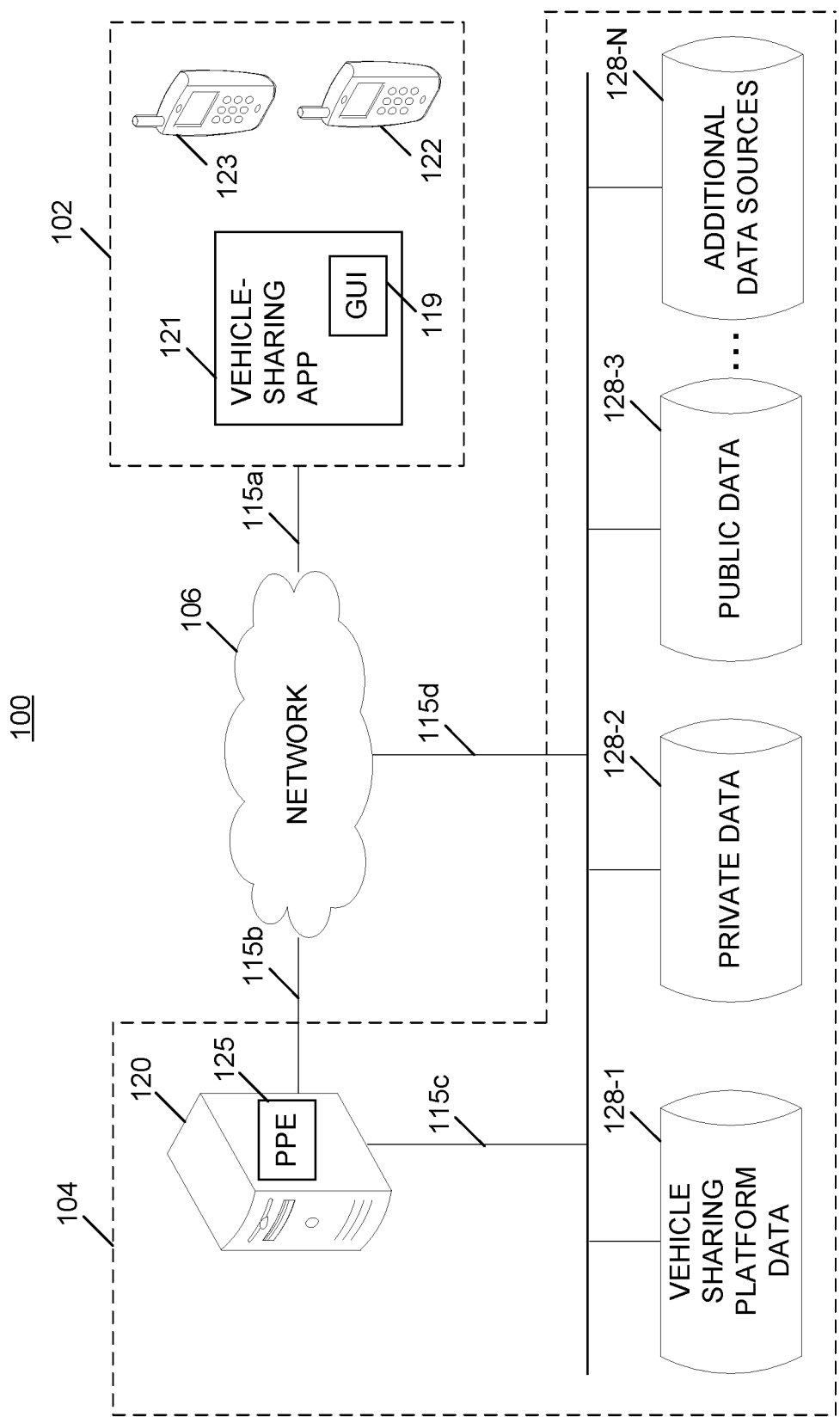
FIG. 1 illustrates a block diagram of an exemplary vehicle-sharing platform in accordance with one aspect of the present disclosure.

FIG. 1 illustrates a block diagram of an exemplary vehicle-sharing platform 100 in accordance with one aspect of the present disclosure. Vehicle-sharing platform 100 may include front end devices 102, a data system 104, and/or a network 106. The system may include additional, fewer, or alternate components, including those discussed elsewhere herein.

Vehicle-sharing platform 100 may facilitate the prediction of rental vehicle use preferences for participating vehicle owners, and further manage the scheduling of and payment for their vehicles with participating renters that meet the vehicle use preferences. Generally, requests to rent vehicles from participating renters are only approved if the renters meet rental vehicle use preferences. In some aspects, for participating renters to even be able to view vehicle(s) provided by a particular vehicle owner as available on the vehicle-sharing platform 100, participating renters must meet predicted rental vehicle use preferences, which the particular vehicle owner may have confirmed. The vehicle-sharing platform 100 may perform a novel dynamic setup process to automatically predict the preferences. In particular, the vehicle owner is asked a series of questions, and each subsequent prompt/question is based upon the vehicle owner's response to the previous question. In other aspects, the vehicle owner may modify the predicted rental vehicle use preferences, and therefore participating renters must meet the modified rental vehicle use preferences to view available vehicle(s) provided by that vehicle owner.

Front end devices 102 may include devices 122 and 123. Each of devices 122, 123 may include any suitable communication device that is configured to facilitate user interaction and exchange data with network 106. For example, devices 122, 123 may be mobile devices (e.g., smartphones, cell phones, tablets, netbooks, phablets, smart glasses, smart contact lenses, electronic wearable devices, personal desktop computers, laptops, pagers, personal digital assistants, smart watches, and/or other computing devices capable of wired and/or wireless communication). In the embodiments discussed herein, device 122 belongs to a participating renter and device 123 belongs to a participating vehicle owner. Each of the devices 122, 123 may be configured to execute a vehicle-sharing application to facilitate renting/ sharing of an owner's vehicle. As such, vehicle-sharing platform 100 may support a P2P vehicle sharing model that enables a participating vehicle owner to rent/share his vehicle to a participating renter for agreed upon periods of time. The vehicle-sharing applications executing on devices 122 and 123 may be considered to be front end interfaces associated with the vehicle-sharing platform 100. Accordingly, in various aspects, each of the devices 122, 123 may be any suitable device configured to display a graphical user interface (GUI) 119 within a dedicated application 121 (i.e., vehicle-sharing application) to enable users to interact with devices 122, 123. Although FIG. 1 illustrates GUI 119 as part of dedicated application 121, those of ordinary skill in the relevant art(s) will appreciate that vehicle-sharing platform 100 may be implemented in other ways without departing from the spirit and scope of the present disclosure. For example, application 121 may be a web browser application, and GUI 119 may be provided by JavaScript or other instructions of a web page stored on a remote server.

In various aspects, devices 122, 123 may be configured to receive data from, and send data to, data system 104 via a wired or wireless link 115a and network 106. Notably, owner device 123 may be configured to receive data from data system 104 and to display one or more prompts and/or options to a user via GUI 119 based upon the received data. Owner device 123 may also be configured to send the user's answers and/or selected options in response to the prompts to data system 104 and to receive data from data system 104 in response to this sent data. Accordingly, owner device 123 may facilitate collecting information from a user and communicating with data system 104 via network 106 to display one or more predicted user preferences for the user via GUI 119. Renter device 122 may be configured to receive data from data system 104 and to display an indication of (e.g., picture of, make/model of, etc.) the owner's vehicle(s) via GUI 119 if the user (i.e., renter) of the renter device 122 satisfies the preferences of the vehicle owner.

Network 106 may include any appropriate combination of wired and/or wireless communication networks. For example, network 106 may include any combination of a local area network (LAN), wireless local area network (WLAN), a metropolitan area network (MAN), a wide area network (WAN), and may facilitate a connection to the Internet. To provide further examples, network 106 may include wired telephone and cable hardware, satellite, cellular phone communication networks, etc.

Data system 104 may include a computing device 120 and N databases 128-1, 128-2, . . . 128-N. Although a single computing device 120 is illustrated in FIG. 1, one of ordinary skill in the art will understand that two or more computing devices 120 may be located across one or more locations. In some aspects, computing device 120 may be implemented with hardware and/or software components, some of which may facilitate communications with one or more databases 128-1, 128-2, . . . 128-N via any suitable number of wired and/or wireless links, such as 115b, 115c, and/or 115d. The dedicated application 121 described above that is included in the front end devices 102 (e.g., devices 122, 123) may be associated with the computing device 120. Other various software applications installed in front end devices 102 (e.g., devices 122, 123), such as weather applications, map applications, etc., may be supported by the computing device 120 or other third party servers (e.g., commercial vendors, governmental entities, industry associations, nonprofit organizations, or others). The computing device 120 may be configured to receive data from the various software applications of the front end devices 102 (e.g., by way of suitable application program interfaces) via network 106. Although additional wireless links are not shown in FIG. 1 for purposes of brevity, those of ordinary skill in the relevant art(s) will appreciate that computing device 120 may communicate with any of databases 128-1, 128-2, . . . 128-N using any combination of wired and/or wireless links. Furthermore, those of ordinary skill in the relevant art(s) will also appreciate that different types of networks and/or links may be implemented based upon the type of data that is accessed from a respective database 128-1, 128-2, . . . 128-N. For example, a private network and one or more secure links may be implemented to facilitate communications between computing device 120 and any of databases 128-1, 128-2, . . . 128-N (e.g., via link 115c) to enable computing device 120 to retrieve data of a sensitive, private, and/or proprietary nature. To provide another example, a link via the Internet may be implemented for communications between computing device 120 and any of databases 128-1, 128-2, . . . 128-N (e.g., via links 115c and 115d) to enable computing device 120 to retrieve data that is publicly available or not of a sensitive nature.

Although databases 128-1, 128-2, . . . 128-N are illustrated in FIG. 1 as separate databases and separate from computing device 120, in some aspects data stored in one or more of databases 128-1, 128-2, . . . 128-N is additionally or alternatively stored in one or more storage components integrated as part of (or otherwise associated with) computing device 120. Alternatively, or in addition, one or more of the databases 128-1, 128-2, . . . 128-N may be associated with a third party server.

In an aspect, one or more databases 128-1, 128-2, . . . 128-N may store historical data that describes driving behavior of a vehicle owner, or vehicle-sharing application usage patterns of the vehicle owner. For example, historical data may include traffic data, vehicle collision data (e.g., insurer claims data), geographic location data (e.g., GPS data), mobile device data, telematics data, vehicle mounted-sensor data, autonomous vehicle sensor data, environment data (e.g., weather data) and/or image data, which may be collected by the vehicle-sharing platform 100 by way of the computing device 120 and/or device 123, third party servers, and/or sensors associated with an owner's vehicle before, during, and/or after a trip. As such, historical data may provide contextual information of the vehicle related to vehicle damage, extent of injuries at a vehicle collision, number and identification of vehicles involved, dates and times of vehicle use, duration of vehicle use, mobile device GPS location, vehicle GPS location, speed, RPM or other tachometer readings of the vehicle, lateral and longitudinal acceleration of the vehicle, environment of the vehicle during vehicle operation (e.g., traffic, construction, accidents in the area, weather or road conditions at the time of an accident or duration of vehicle use), and/or other information relating to use of the vehicle. Historical data may also describe vehicle-sharing application usage patterns of the vehicle owner. For example, historical data may also include mobile device data or other data indicating requests containing details of a rental trip that were approved or rejected by participating vehicle owners, and feedback or complaints submitted by the participating vehicle owners as to the treatment of their vehicles by the renters. Historical data collected by computing device 120 may be stored in vehicle-sharing platform database 128a, and historical data collected by third-party servers may be stored in private database 128-2 and/or public database 128-3, for example.

In another aspect, one or more of databases 128-1, 128-2, . . . 128-N may store historical data that describes driving behaviors of prospective renters. Similar to the historical data that describes driving behavior of a vehicle owner mentioned above, historical data that describes driving behaviors of prospective renters may include vehicle collision data, geographic location data (e.g., GPS data), mobile device data, telematics data, vehicle mounted-sensor data, autonomous vehicle sensor data, environment data (e.g., traffic and/or weather data) and image data, which may be collected by the vehicle-sharing platform 100 by way of the computing device 120 and/or device 122, third party servers, or sensors associated with a renter's vehicle before, during, and/or after a trip.

In another aspect, historical data stored in the one or more databases 128-1, 128-2, . . . 128-N may include rental evaluation data that includes assessments of rental trips completed by the renters using the vehicle-sharing platform 100. The assessments may be automatically determined by the vehicle-sharing platform 100, or may be ratings, feedback, or comments for the renters provided by the vehicle owners from whom the renters have rented vehicles.

As with historical data relating to the vehicle owner, historical data relating to the renter that is collected by computing device 120 may be stored in vehicle-sharing platform database 128-1, and historical data collected by third-party servers may be stored in private database 128-2 and/or public database 128-3, for example. Rental evaluation data collected by computing device 120 may be stored in vehicle-sharing platform database 128-1, for example. It should be noted that, to comply with state, local, and/or federal privacy regulations, the computing device 120 may need to obtain the user's consent to store and/or access the historical data.

Private database 128-2 may include proprietary information or any suitable data related to the user that may be collected and/or mined from one or more sources that may not otherwise be readily or conveniently available via public channels. This propriety information may include, for example, information gathered from third party servers related to the user's driver's license suspensions, driving citations (e.g., moving violations) issued to the user, accident reports regarding details of accidents in which the user has been involved, the user's credit score history, claims data, vehicle event data recorder information or any suitable vehicle telematics data, and/or user account information such as credit card accounts, mortgages, financial institutions, for example. Claims data may be associated with actual insurance claims arising from real world vehicle collisions, and generally represents insurance claims filed by vehicle owners. Claims data may identify a particular collision, policy owners, involved vehicles, a location where the collision occurred, property involved, repair and/or replacement costs and/or estimates, a time and date of the collision, and/or various other information. Although some of this information may be publicly available, this information may not be easily obtained online and/or may need to be appropriately formatted for database storage. Therefore, examples of third party sources of such proprietary information may include any suitable source of census reports, crime reports, weather reports, vehicle history reports, etc. As mentioned above, to comply with state, local, and/or federal privacy regulations, the computing device 120 may need to obtain the user's consent to access this information via one or more prompts generated via GUI 119.

Public database 128-3 may represent one or more public data sources. Database 128-3 may include information about the user (e.g., a participating renter) that is readily available via one or more public channels. Examples of public data source information may include a user's current address, current occupation, marital status, etc. Examples of the public data sources may include city record data, and publicly available social networking data, such as data collected from a networking website such as LinkedIn.com, for example.

Prior to storage in the databases 128-1, 128-2, . . . 128-N, some of the historical data and/or rental evaluation data may have been uploaded to the computing device 120 via the network 106 from the devices 122, 123, third party servers, and/or sensors associated with a vehicle. Additionally, or alternatively, some of the data may have been generated by the computing device 120. The computing device 120 may store data in the databases 128-1, 128-2, . . . 128-N and/or may access data stored in the databases 128-1, 128-2, . . . 128-N when executing various functions and tasks associated with the methods described herein.

In accordance with various aspects, computing device 120 may facilitate the collection of information (e.g., identity data including a user name and password affiliated with an account profile) from a vehicle owner and/or historical data of the vehicle owner from one or more of databases 128-1, 128-2, . . . 128-N. Analysis of the historical data stored in databases 128-1, 128-2, . . . 128-N may be used to predict a vehicle owner's rental preferences for sharing vehicles with renters. For example, if all requests for reservations of vehicles for at least one week were rejected, and most requests for reservations of vehicles for less than 24 hours were approved, computing device 120, by executing a preference prediction engine (PPE) 125, may suggest that duration of rental or time of day may be a user preference. As another example, if feedback or complaints submitted by the participating vehicle owners frequently mentioned how tidy (or untidy) a vehicle was when returned by the renter, computing device 120 executing PPE 125 may suggest that cleanliness is a user preference. The computing device 120 may then send predicted preferences data to owner device 123 to be displayed via GUI 119 within the dedicated application 121. As such, because the computing device 120 may in some embodiments retrieve information from one or more of databases 128-1, 128-2, . . . 128-N to predict preferences, a vehicle owner need not provide information that would otherwise be required to learn owner preferences. Therefore, the GUI 119 presents information efficiently, which improves the usability of vehicle-sharing applications executing in owner device 123.

In an embodiment, the computing device 120 may receive the historical data, and process the historical data to generate prompts for predicting rental vehicle use preferences for the vehicle owner. An initial prompt may generally be designed to prompt a vehicle owner for answer(s) that may be used to learn characteristics of potential vehicle renters that are preferred by the vehicle owner. To fine tune predicted user preferences, the computing device 120 may receive data from and send data to owner device 123 via dedicated application 121 for display on GUI 119 such that the computing device 120 dynamically adjusts subsequent prompts presented to the vehicle owner based upon the vehicle owner's answers to previous prompts. That is, after the vehicle owner answers the initial prompt, a subsequent prompt may be designed to prompt the vehicle owner for additional answer(s) that may be used to learn additional characteristics of the potential vehicle renters with respect to the characteristics learned from the initial prompt answers. Such prompts may also be accompanied with answer choices corresponding to the various characteristics of potential vehicle renters.

In some embodiments, the computing device 120 may derive answer choices based upon the processed historical data. For example, assuming that safe drivers may desire to rent vehicles to other safe drivers, upon processing the historical data that describes safe driving behaviors for the vehicle owner (e.g., driving the speed limit, no traffic accidents, etc.), the computing device 120 may be configured to generate an initial prompt that is accompanied with at least one answer choice corresponding to driving behavior. As another example, upon processing the historical data that describes vehicle-sharing application usage patterns of the vehicle owner (e.g., repeatedly declining to rent a vehicle to a renter looking to rent for one or two days), the computing device 120 may be configured to generate an initial prompt that is accompanied with at least one answer choice corresponding to duration of vehicle rental. In this way, an initial prompt having answer choices derived from historical data may improve the user experience of the vehicle owner, because displaying relevant information customized to the vehicle owner (and not unnecessary or irrelevant information) may streamline user interactions. Subsequent prompts designed to prompt the vehicle owner for additional answer(s) that may be used to learn additional characteristics of the potential vehicle renters (e.g., additional details relating to the characteristics learned from the owner's initial answers) may also contribute to the improved the user experience, again because the vehicle owner is being asked to provide minimum information that is of particular relevance to the vehicle owner.

In other embodiments, the computing device 120 may be configured to generate an initial prompt that is accompanied with a default set of answer choices (i.e., not derived from historical data), to prompt vehicle owners for answer(s) that may be used to learn characteristics of potential vehicle renters that are preferred by the vehicle owners. That is, all vehicle owners may view the same initial prompt accompanied with the same default answer choices. Nevertheless, because subsequent prompts may be designed to prompt vehicle owners for additional answer(s) that may be used to learn additional characteristics of the potential vehicle renters with respect to the initially learned characteristics, the vehicle owners are asked to provide information that is of particular relevance to the vehicle owner, thereby improving the user experience.

Exemplary User Experience Layers

FIGS. 2A and 2B illustrate several prompts that represent a vehicle owner's interaction with the vehicle-sharing application, according to an embodiment. The prompts may be displayed on a suitable device, such as on owner device 123 via GUI 119, as shown in FIG. 1. The specific number of prompts and the content illustrated in the prompts shown in FIGS. 2A and 2B are shown for illustrative purposes only. More or less prompts and other content may be displayed to the vehicle owner to accurately predict the owner's preferences.

Each set of prompts shown in FIGS. 2A and 2B may represent one or more sequentially-presented interactive windows or screens as displayed on a GUI, such as GUI 119 of FIG. 1, for example. As will be appreciated by those of ordinary skill in the relevant art(s), the prompts shown in FIGS. 2A and 2B may be included in any other suitable number of windows. For example, prompts represented in FIG. 2A or 2B as inhabiting two or more windows may instead be combined in a single window. To provide another example, prompts represented in FIG. 2A or 2B as inhabiting a single window may instead be separated into two or more windows. The prompts and answer choices may be displayed as text, images, checkboxes, radio buttons, drop down list, slide bars, etc. Furthermore, although not shown in FIGS. 2A and 2B, the user's answer selections to the first prompts may be sent to, or otherwise received by, another computing device such as computing device 120 of FIG. 1, for example. The next sequentially displayed prompts may then be determined based upon the user's answer selections to the first prompts.

For example, with reference to FIG. 2A, analysis of historical data may cause PPE 125 of FIG. 1 to generate answer choices "previous driving history," "duration of vehicle rental," "years of driving experience," and "other" at a first prompt window 202 of a series of prompt windows 200 for display via GUI 119 within the dedicated application 121 of owner device 123. As such, the prompts may be designed to prompt a vehicle owner to identify which characteristics of a renter are important to her. For instance, PPE 125 may analyze telematics data or claims data of a vehicle owner, determine that the vehicle owner exhibits safe driving behavior (e.g., drives the speed limit, did not receive a speeding ticket in the past year, etc.), and assume that the vehicle owner prefers a renter exhibiting similar driving behavior. In accordance with the dynamic adjustment capabilities of the PPE 125, the next prompt windows in the series of prompt windows 200 presented to the vehicle owner may be generated based upon the vehicle owner's answers at prompt window 202. For example, selection of answer choices "duration of vehicle rental" and "years of driving experience" at first prompt window 202 may cause the PPE 125 to generate subsequent prompt windows or sub-prompt windows for display via GUI 119. As such, the subsequent prompt windows or sub-prompt windows may be designed to request additional details from the vehicle owner regarding duration of vehicle rental and years of driving experience, as shown in prompt windows 204 and 206, respectively. Prompt windows related to "previous driving history" and "other" need not be displayed in prompt windows 204 and 206 or in any prompt windows thereafter if not selected by the vehicle owner, and therefore such dynamic adjustment capabilities of the PPE 125 lessen the burden on a user by displaying less extraneous information. Selection of answer choices in prompt windows 204 and 206 may cause the computing device 120 to predict one or more user preference values for the user. For example, selection of "duration of vehicle rental" and "no" in prompt windows 202 and 204 respectively may cause the computing device 120 to predict a parameter of "duration of vehicle rental" set to less than a week as preference values. Selection of "years of driving experience" and "no" in prompt windows 202 and 206 respectively may cause the computing device 120 to predict a parameter of "age of renter" set to over 21 years of age as preference values.

The user preference values predicted for the user may be displayed via the GUI 119 within the dedicated application 121 of owner device 123. In some embodiments, to display the user preference values, the PPE 125 may generate another prompt window that includes the user preference values. Such prompt window may be designed to prompt the vehicle owner for confirmation of the user preference values. If the vehicle owner desires to modify the predicted user preference values, the vehicle owner may provide a user input to modify the user preference values via the GUI 119 within the dedicated application 121 of owner device 123.

Figure 2C:
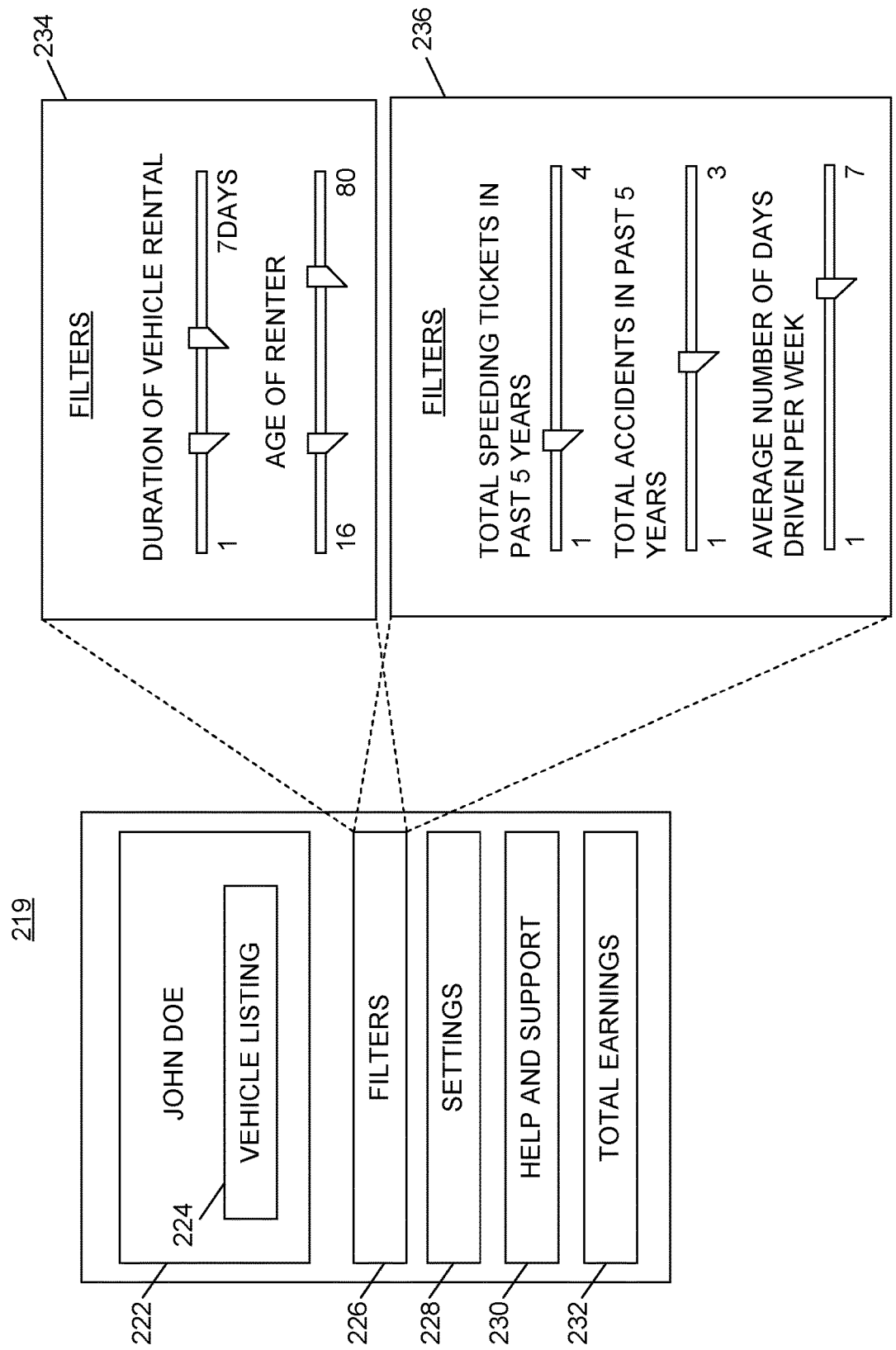
FIG. 2C illustrates exemplary filters in accordance with one aspect of the present disclosure.

In some embodiments, to display the user preference values, the PPE 125 may generate graphical filters corresponding to the user preference values. Specifically, the PPE 125 may map the user preference values to settings of the graphical filters, such that any user modifications to the settings of the graphical filters cause changes to the corresponding user preference values. For example, as shown in FIG. 2C, upon selecting a "filters" button 226 on a GUI 219 (e.g., GUI 119 of FIG. 1), a user may view a filters page 234 with automatically populated filter parameters and values. Selection of "duration of vehicle rental" and "no" in prompt windows 202 and 204 respectively may automatically trigger a filter parameter of "duration of vehicle rental" set to less than a week (e.g., 3-5 days) as default parameter values. Selection of "years of driving experience" and "no" in prompt windows 202 and 206 respectively may trigger a filter parameter of "age of renter" set to over the age of 21 (e.g., 35-50 years of age) as default parameter values. No other filters may be displayed in this example, which keeps extraneous information to a minimum.

To provide another example, another series of prompt windows 210 is shown in FIG. 2B. Here, selection of the answer choice "previous driving history" at a first prompt window 212 may cause the PPE 125 to generate prompt windows for display via GUI 119 to obtain additional details from the user regarding previous driving history, as shown in prompt window 214. Prompt windows related to "duration of vehicle rental," "years of driving experience," and "other" need not be displayed in prompt window 214 or in any prompt windows thereafter if not selected by the user. Selection of answer choices in prompt window 214 as shown may cause the computing device 120 to predict one or more user preference values for the user. For example, because the vehicle owner did not indicate in window 214 that urban city driving experience is an important factor, PPE 125 may not factor in braking data (or not factor in braking data as heavily) when predicting one or more user preference values (with the assumption being that driving in urban cities such as New York City requires a driver to frequently brake). However, because the vehicle owner indicated that "speeding violations" and "number of accidents" are important factors, PPE 125 may predict user preference values corresponding to a maximum speed registered according to telematics data (e.g., less than 70 mph) and a maximum number of insurance claims filed as a result of an accident (e.g., less than three claims filed in a period of 5 years).

In some embodiments, PPE 125 may be a machine learning program that may be trained using supervised or unsupervised machine learning. PPE 125 may employ a neural network, which may be a convolutional neural network, a deep learning neural network, or other suitable network. Machine learning may involve identifying and recognizing patterns in existing data (such as the relationship between answers to prompts and established user preferences), in order to facilitate making predictions. Models may be created based upon example inputs of data in order to make valid and reliable predictions for novel inputs. For instance, in supervised machine learning, PPE 125 may be trained by having a large test group of vehicle owners who provide a large set of answers to prompts and submit additional details of their preferences, to identify patterns between the answers and user preferences. The preference details may serve as labels to the large set of answers. The trained PPE 125 may then generate a general rule that maps inputs to outputs. Thereafter, when subsequent novel inputs (i.e., answers to prompts) are provided, PPE 125 may, based upon the general rule, accurately predict the correct or a preferred output (i.e., user preferences).

The series of prompts 200 and 210 shown in FIGS. 2A and 2B may be displayed in a manner optimized for viewing on owner device 123. For instance, prompt windows 202 and 204 may be displayed as separate windows, where a user must "submit" an answer choice to prompt window 202 for owner device 123 to display prompt window 204. As another example, prompt windows 202 and 204 may be displayed in the same window, where a user must "submit" an answer choice to prompt window 202 and scroll down to see display prompt window 204 displayed in response to the submitted answer choice to prompt window 202.

Further, although the series of prompts 200 and 210 shown in FIGS. 2A and 2B have different predicted answer choices in prompt windows 202 and 204 based upon user-affiliated data, PPE 125 may be configured to generate standard (i.e., not predicted) answer choices for all users, regardless of the user-affiliated data. For instance, PPE 125 may be configured to generate an exhaustive list of prospective renter characteristics that may be desired by the vehicle owner, rather than a subset of predicted characteristics.

For increased flexibility, upon selection of a "settings" button 228, the user may be able to modify various settings of the vehicle-sharing application, such as disabling the user's account profile, modifying the user's account profile, etc. GUI 219 may also display the user's account profile 222, a vehicle listing 224 indicating information about the owner's vehicle that is available for rent, a help and support button 230 to contact customer service, and a total earnings button 232 to view a current balance from payment received from renters, for example.

Exemplary Computing Device with PPE

Figure 3:
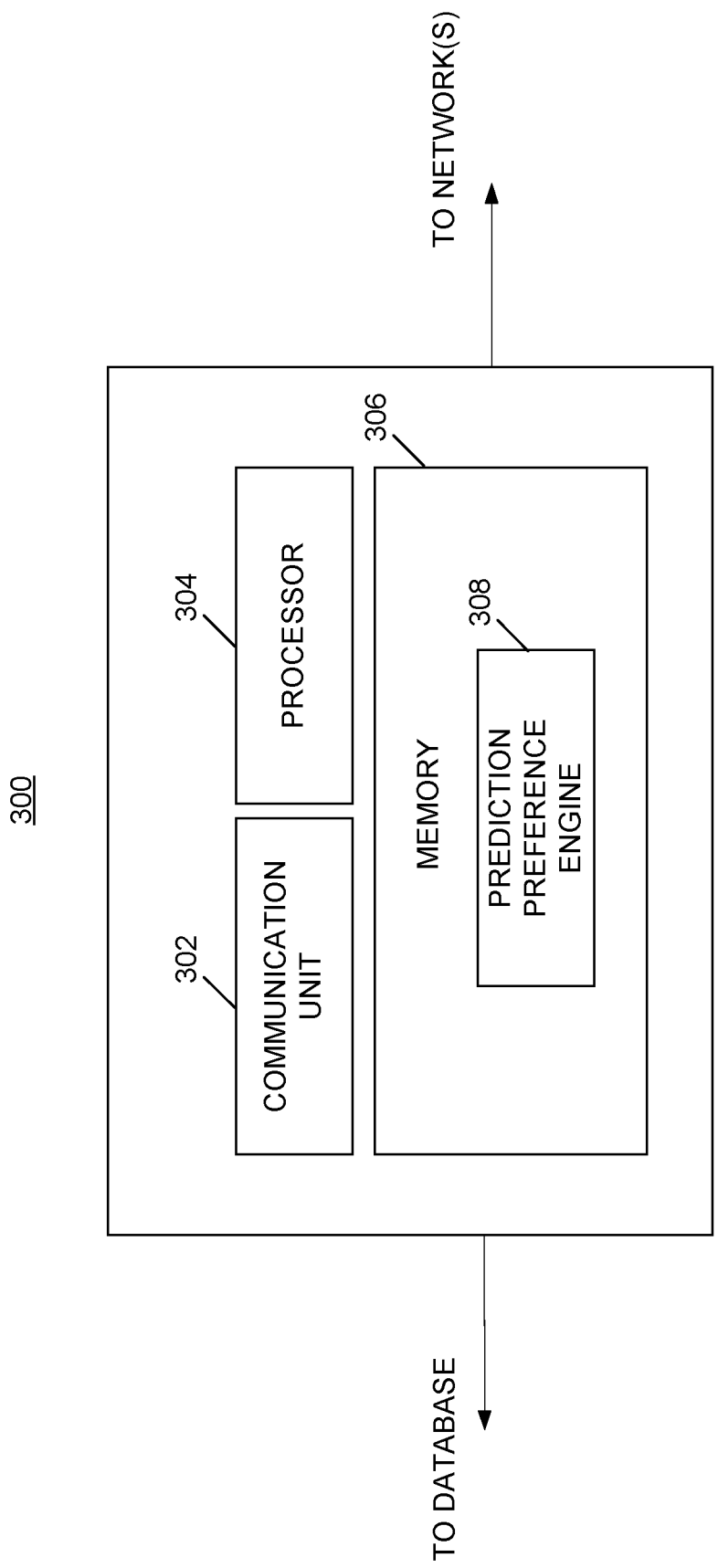
FIG. 3 illustrates a block diagram of an exemplary computing device having a preference prediction engine in accordance with one aspect of the present disclosure.

FIG. 3 illustrates a block diagram of an exemplary computing device 300 (e.g., computing device 120 of FIG. 1) in accordance with an exemplary aspect of the present disclosure. Computing device 300 includes communication unit 302, processor 304, and memory 306. Memory 306 may store a prediction preference engine (PPE) 308 (e.g., PPE 125 of FIG. 1). The computing device 300 may include additional, fewer, or alternate components, including those discussed elsewhere herein.

Computing device 300 may be implemented as any suitable computing or mobile device. For example, computing device 300 may be implemented within one or more servers.

Communication unit 302 may be configured to facilitate data communications between PPE 308 and one or more databases and/or networks, such as one or more of databases 128-1, 128-2, . . . 128-N and/or network 106, as previously discussed with reference to FIG. 1, for example. Communication unit 302 may be configured to facilitate such communications in accordance with any suitable communication protocol or combination of protocols. In various aspects, communication unit 302 may be configured to utilize the same or different communication protocols to facilitate respective communications between one or more databases 128-1, 128-2, . . . 128-N and network 106. In an aspect, communication unit 302 may be configured to send data to front end devices 102, for example, as shown in FIG. 1. Communication unit 302 may send data in accordance with one or more applications (e.g., vehicle-sharing applications) executed on one or more devices that are part of the front end devices 102, such as devices 122, 123 as shown in FIG. 1. Communication unit 302 may send data that enables owner device 123 to display one or more prompts, answer choices, and/or user selections in accordance with embodiments described herein. Communication unit 302 may also be configured to receive data from one or more devices, such as devices 122, 123 as shown in FIG. 1.

The data received from owner device 123 may be processed by communication unit 302 and/or processor 304 and utilized to determine a number of prompts and/or sub-prompts to eliminate, to prepopulate, and/or to predict a user preference for the vehicle owner. The data received from renter device 122 may be processed by processor 304 and utilized to identify that the renter has requested to rent a vehicle from a vehicle owner having preferences that the renter satisfies.

As will be appreciated by those of ordinary skill in the relevant art(s), communication unit 302 may be implemented with any combination of suitable hardware, firmware and/or software to enable these functions. For example, communication unit 302 may be implemented with any number of wired and/or wireless transceivers, network interfaces, physical layers (PHY), etc. Communication unit 302 may optionally enable communications between PPE 308 and one or more additional networks, which may or may not be part of network 106. For example, communication unit 302 may be configured to communicate with cellular networks in addition to network 106.

Processor 304 may be configured to communicate with memory 306 to store to and read data from memory 306. In accordance with various aspects, memory 306 is a computer-readable non-transitory storage device that may include any combination of volatile memory (e.g., a random access memory (RAM)) and/or non-volatile memory (e.g., battery-backed RAM, FLASH, etc.). Memory 306 may be configured to store instructions executable on processor 304. These instructions may include machine readable instructions that, when executed by processor 304, cause processor 304 to perform various acts. PPE 308 stored in memory 306 may specifically be configured to store instructions executable by processor 304 to predict user preferences.

For example, PPE 308 may include instructions and/or algorithms that, when executed by processor 304, cause processor 304 to communicate with owner device 123 to facilitate the prediction of a user preference, e.g., as discussed above in connection with FIGS. 1 and 2A through 2C. The executable instructions may enable communications unit 302 to send data to owner device 123 that causes owner device 123 to display prompts and one or more answer choices for selection by a user. Executable instructions may also enable communications unit 302 to receive a user's answer to one or more displayed prompts. In some embodiments, PPE 308 may include instructions, that when executed by processor 304, cause processor 304 to retrieve data from one or more of databases 128-1, 128-2, . . . 128-N to generate answer choices that accompany the prompts and/or predict a user preference based upon answers to the prompts.

Exemplary User Navigation Path Using Vehicle-Sharing Platform

Figure 4:
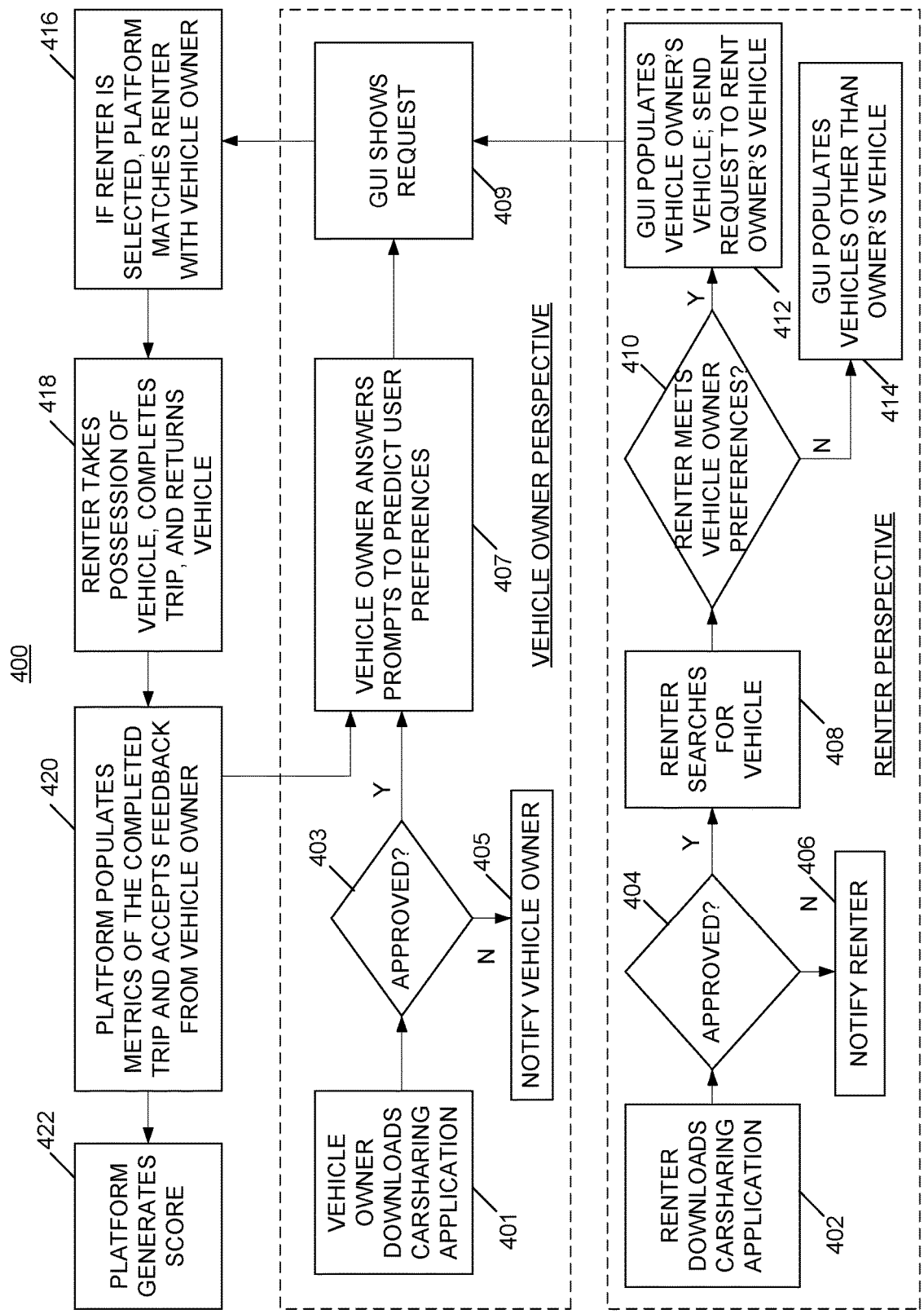
FIG. 4 illustrates a flow diagram of exemplary user navigation paths in accordance with one aspect of the present disclosure.

FIG. 4 illustrates a flow diagram 400 of exemplary user navigation paths, from the perspective of both the vehicle owner and renter, for facilitating vehicle-sharing between the two parties in accordance with an exemplary aspect of the present disclosure.

Flow diagram 400 may begin with the vehicle owner and renter each downloading a P2P vehicle-sharing application (e.g., dedicated application 121) using their respective devices (e.g., devices 123, 122), as shown in blocks 401 and 402, respectively, in order to participate in the vehicle-sharing platform (e.g., vehicle-sharing platform 100). The vehicle-sharing platform may perform an approval process, as shown in blocks 403 and 404, by requiring each party to accept terms of usage and/or pass one or more background checks (e.g., age check, valid driver's license check, criminal background check, vehicle driving history, etc.). If any of the parties fails to pass the approval process, the vehicle-sharing platform may notify the ineligible party, as shown in blocks 405 and 406, and/or present reasons as to why the party failed the approval process. If any of the parties pass the approval process, the party may be considered as an active participant of the vehicle-sharing platform and may be given access to use the vehicle-sharing platform.

With respect to the renter, the vehicle-sharing platform 100 may receive an indication that the renter has agreed to terms, as part of the approval process, for renting a vehicle from the vehicle owner. The terms may include a notice that vehicle owners have the right to set and apply customized user preferences and/or other restrictions on their vehicles, and that the number of available vehicles for rent to the renter may be affected by how well various characteristics of the renter "fits" the vehicle owner's preferences. Accordingly, in some embodiments, the terms may include a notice that various data (e.g., historical data, rental evaluation data) may be collected (e.g., via renter device 122) and used in order to be granted access to the vehicle sharing platform 100 and/or to evaluate whether the renter "fits" the vehicle owner's preferences. The terms may include a notice that vehicle telematics data may be collected (e.g., via renter device 122) during the rental trip, and/or that penalties or incentives may be applied to the renter based upon the vehicle telematics data.

As shown in block 407, upon approval for participation in the vehicle-sharing platform 100, the vehicle owner's device 123, via a GUI (e.g., GUI 119) of the vehicle-sharing application, may display prompts/questions and answer choices, such as those shown in FIGS. 2A and 2B. The vehicle-sharing platform 100 or a component thereof (e.g., PPE 125), based upon the answer choice selections from the vehicle owner, may predict preferences of the vehicle owner. The vehicle owner may also set up a profile by creating a login name and password to describe the vehicle available for rent, specify a price to rent the vehicle, etc. The profile may also include a switch that may be toggled to activate or deactivate the rental availability of the vehicle.

Upon approval for participation in the vehicle-sharing platform 100, the renter's device (e.g., device 122), via a GUI (e.g., GUI 119) of the vehicle-sharing application, may display a search portal for the renter to input details (e.g., which type of vehicle he desires, pick-up location, day, and time, drop-off location, day, and time, etc.) for a rental vehicle request, thereby allowing the renter to search for vehicles as shown in block 408. The vehicle-sharing platform 100 (e.g., computing device 120), based upon the input details provided by the renter, may search for available vehicles based upon the rental vehicle request by querying a database (e.g., database 128-1) against the input details and present any available vehicles in a results page.

In order to determine whether the owner's vehicle should appear as an available vehicle on the renter's results page, computing device 120 may determine, as shown in block 410, whether the renter (i.e., qualifications of the renter, as described by telematics and/or other historical data, and/or by rental evaluation data) and/or input details of the rental vehicle request satisfy the vehicle owner preferences that were predicted in block 407. If the renter and/or input details satisfy the vehicle owner preferences, the renter's results page may display the vehicle owner's vehicle as available, as shown in block 412. The renter may proceed by selecting the owner's vehicle to rent, selecting other vehicles available from other vehicle owners that the renter may be qualified to rent, or may decide not to select any vehicles. If the renter and/or input details do not satisfy the vehicle owner preferences, the renter's results page may not display the vehicle owner's vehicle as available, as shown in block 414, but may otherwise display other vehicles available from other vehicle owners that the renter may be qualified to rent.

Upon selecting the owner's vehicle to rent and subsequently sending a request to the vehicle owner via the renter's device across a network (e.g., network 106), as shown in block 412, the GUI shown on the vehicle owner's device (e.g., device 123) may populate the request, as shown in block 409. The computing device 120, for example, may facilitate the transfer of the request between the renter's device and the vehicle owner's device (e.g., by receiving the request from renter device 122 and forwarding the request to owner device 123). The request may include some or all of the input details described above. If the vehicle owner decides to accept the request, the computing device 120 may match the renter with the vehicle owner, as shown in block 416, to facilitate coordination of the vehicle sharing and communication between the two parties. In some embodiments, the vehicle-sharing platform may enable in-app messaging to facilitate communications (e.g., via text messages) between the renter and vehicle owner upon a match.

As shown in block 418, the renter may proceed to physically take possession of the owner's vehicle at the designated agreed upon day, time, and pick-up location, and return the owner's vehicle at the end of the trip at the designated agreed upon day, time, and drop-off location. During the rental trip, the vehicle-sharing platform may generate telematics data of the vehicle via sensors associated with the vehicle and/or the renter's device (e.g., device 122) that may be present in the vehicle during the rental trip. At the end of the rental trip, the vehicle-sharing platform may utilize location-tracking technologies (e.g., GPS) of the vehicle to confirm that the vehicle has been dropped-off at the correct location.

The vehicle-sharing platform may populate metrics of the completed trip and accept feedback from the vehicle owner as shown in block 420, and calculate a driving score for the renter based upon the telematics data as shown in block 422. The metrics and/or score may be populated as an in-app message and shared between the two parties, or may otherwise be delivered to notify the vehicle owner and/or vehicle renter. The driving score may also take into consideration any feedback from the vehicle owner. For example, if the vehicle has scratches on the car that were not there prior to the rental trip, or if the interior of the vehicle has been damaged, the driving score may be lowered. If the vehicle is in the same condition as it was prior to the rental trip, or if the renter took measures to improve the conditions of the vehicle (e.g., cleaned the car), the driving score may be increased.

Figure 5:
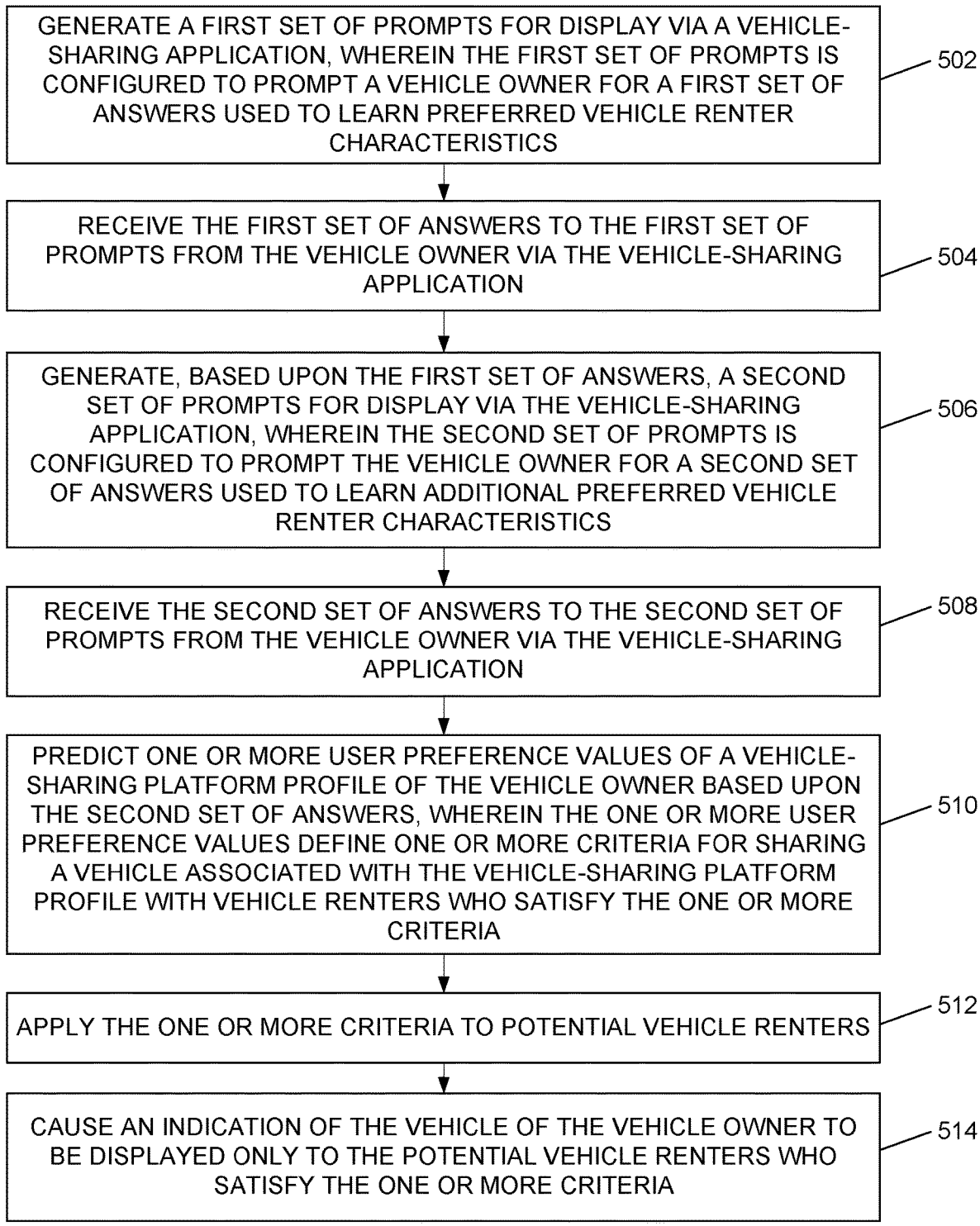
FIG. 5 illustrates an exemplary method performed by an exemplary vehicle-sharing platform or component(s) thereof in accordance with one aspect of the present disclosure.

Exemplary Methods of Predicting a User Preference for a Vehicle-Sharing Platform FIG. 5 illustrates an example method 500 in accordance with an exemplary aspect of the present disclosure. Method 500 may be performed by exemplary vehicle-sharing platform 100, and more particularly, by computing device 120 of FIG. 1, for example. The information displayed in method 500 (e.g., prompts and possibly answer choices) may be displayed via a suitable GUI (e.g., GUI 119) running on a suitable device (e.g., owner device 123), and the owner inputs (e.g., answers) may be entered via the same GUI/device, for example.

Method 500 may begin by generating a first set of prompts for display via a vehicle-sharing application (block 502). The first set of prompts may be configured to prompt a vehicle owner for a first set of answers used to learn preferred vehicle renter characteristics. Vehicle renter characteristics may include past behaviors (e.g., driving behaviors of the renter), demographics information (e.g., age of the renter), rental requirements (e.g., required duration, distance or area of travel, etc.) of the renter, or other suitable characteristics. An example of the first set of prompts and accompanying answer choices is illustrated in first prompt window 202 of FIG. 2A. In some embodiments, the first set of prompts may be accompanied by answer choices that have been predicted by the computing device 120. Computing device 120 may derive the answer choices from historical data corresponding to driving behavior of the vehicle owner, and therefore, the answer choices may be considered to be the most relevant or of high importance to the vehicle owner.

Method 500 may proceed by receiving a first set of answers to the first set of prompts from the vehicle owner via the vehicle-sharing application (block 504). For example, as shown in first prompt window 202 of FIG. 2A, the first set of answers (e.g., duration of vehicle rental, years of driving experience) may correspond to preferred vehicle renter characteristics that is of high relevance or importance to the vehicle owner. The first set of answers may be used by the computing device 120 to adapt and generate a second set of prompts for display via the vehicle-sharing application (block 506). Accordingly, the second set of prompts may be dynamically generated by the computing device 120 based upon the owner's first set of answers. The second set of prompts may be configured to prompt the vehicle owner for a second set of answers used to learn additional preferred vehicle renter characteristics.

Method 500 may proceed by receiving a second set of answers to the second set of prompts from the vehicle owner via the vehicle-sharing application (block 508). The second set of answers may correspond to preconfigured answer choices having a binary nature (e.g., yes, no) as shown in second prompt window 204 of FIG. 2A, answer choices predicted from historical data associated with the user (e.g., speeding violations, number of accidents, driving frequency) as shown in second prompt window 214 of FIG. 2B, and/or any other suitable answer choices, such as a text box configured to receive data input from the user (not shown). The second set of answers may be used by the computing device 120 to predict one or more user preference values of a vehicle-sharing platform profile of the vehicle owner (block 510). The one or more user preference values may define one or more criteria for sharing a vehicle associated with the vehicle-sharing platform profile with vehicle renters who satisfy the one or more criteria.

Method 500 may proceed by applying the one or more criteria to a number of potential vehicle renters (block 512). In an embodiment, the vehicle-sharing platform may receive third-party data associated with the potential renters from third-party servers, and subsequently compare the third-party data with user preference values represented by criteria. Such third-party data may be telematics data collected during trips of vehicles owned by the potential renters. Alternatively or in addition, in an embodiment, the vehicle-sharing platform may receive historical data associated with the potential renters from vehicle-sharing platform database 128-1, and subsequently compare the historical data with user preference values represented by criteria. Such historical data may be collected during rental trips of by vehicles owned by vehicle owners participating in the vehicle-sharing platform. In yet another embodiment, the vehicle-sharing platform may receive rental evaluation data associated with the potential renters from vehicle-sharing platform database 128-1, and subsequently compare the rental evaluation data with user preference values represented by criteria. Such rental evaluation data may be collected after rental trips of vehicles owned by vehicle owners participating in the vehicle-sharing platform.

Method 500 may proceed by causing an indication of the vehicle of the vehicle owner to be displayed only to the potential renters who satisfy one or more of the criteria described above (block 514). For example, the make, year, and/or model of the vehicle may appear in a list with other vehicles available for rent. As another example, an image of the vehicle may be displayed. Other suitable ways of graphically indicating that the vehicle is available to the potential renter via the vehicle-sharing application are also contemplated.

Figure 6:
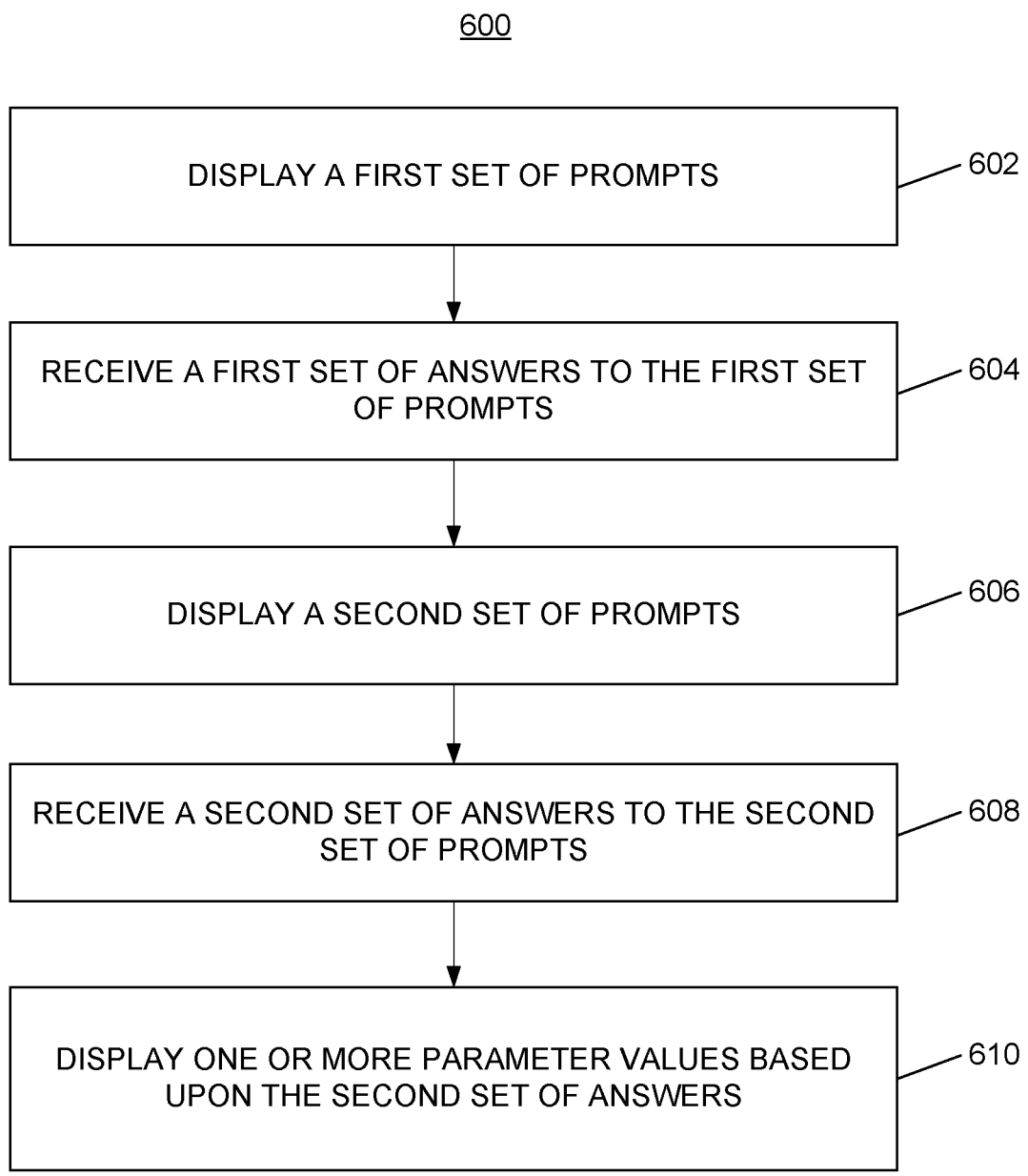
FIG. 6 illustrates an exemplary method performed by a device or component(s) thereof in accordance with one aspect of the present disclosure.

FIG. 6 illustrates an example method 600 that may occur in tandem with method 500. Method 600 may be performed by owner device 123 of FIG. 1. As noted above in connection with method 500, the information displayed in method 600 (e.g., prompts and possibly answer choices) may be displayed via a suitable GUI (e.g., GUI 119) running on the device, and the owner inputs (e.g., answers) may be entered via the same GUI/device, for example.

Method 600 may begin by displaying the first set of prompts (block 602) generated in block 502 of FIG. 5. As mentioned above, in some embodiments, the first set of prompts may be accompanied by answer choices that have been predicted by the computing device 120, and therefore, a customized user navigation path may be made available to the vehicle owner beginning with the first set of prompts.

Method 600 may proceed by receiving a first set of answers to the first set of prompts from the vehicle owner (block 604). The vehicle owner may indicate a first set of answers using any suitable mechanism, such as tapping on radio buttons, check boxes, sliding scales, etc. or entering in text via a keyboard associated with owner device 123.

Method 600 may proceed by displaying the second set of prompts (block 606) generated in block 506 of FIG. 5. As mentioned above, in some embodiments, the second set of prompts may be adapted based upon the first set of answers by the computing device 120. Accordingly, the second set of prompts may be dynamically displayed in the GUI based upon the first set of answers.

Method 600 may proceed by receiving a second set of answers to the second set of prompts from the vehicle owner (block 608). Similar to block 604, the vehicle owner may indicate a second set of answers using any suitable mechanism, such as tapping on radio buttons, check boxes, sliding scales, etc. or entering in text via a keyboard associated with owner device 123.

Method 600 may proceed by displaying one or more parameter values based upon the second set of answers (block 610). The vehicle owner may confirm or adjust the one or more parameter values using any suitable mechanism, such as tapping on radio buttons, check boxes, sliding scales, etc. or entering in text via a keyboard associated with owner device 123.

ADDITIONAL CONSIDERATIONS

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain aspects are described herein as including logic or a number of components or modules. Modules may constitute either software modules (e.g., code stored on a machine-readable medium) or hardware modules. A hardware module is tangible unit capable of performing certain operations and may be configured or arranged in a certain manner. In example aspects, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In some cases, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering aspects in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In aspects in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example aspects, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example aspects, the processor or processors may be located in a single location (e.g., within a home environment, an office environment or as a server farm), while in other aspects the processors may be distributed across a number of locations.

The one or more processors may also operate to support performance of the relevant operations in a "cloud computing" environment or as a Software as a service (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example aspects, the one or more processors or processor-implemented modules may be located in a single geographic location (e.g., within a home environment, an office environment, or a server farm). In other example aspects, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one aspect" or "an aspect" means that a particular element, feature, structure, or characteristic described in connection with the aspect is included in at least one aspect. The appearances of the phrase "in one aspect" in various places in the specification are not necessarily all referring to the same aspect.

Some aspects may be described using the expression "coupled" and "connected" along with their derivatives. For example, some aspects may be described using the term "coupled" to indicate that two or more elements are in direct physical or electrical contact. The term "coupled," however, may also mean that two or more elements are not in direct contact with each other, but yet still co-operate or interact with each other. The aspects are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, condition A or B is satisfied by any one of the following: A is true (or present) and B is false (or not present), A is false (or not present) and B is true (or present), and both A and B are true (or present).

In addition, use of the "a" or "an" are employed to describe elements and components of the aspects herein. This is done merely for convenience and to give a general sense of the description. This description should be read to include one or at least one and the singular also includes the plural unless it is obvious that it is meant otherwise.

Also, the patent claims at the end of this patent application are not intended to be construed under 35 U.S.C. § 112(f) unless traditional means-plus-function language is expressly recited, such as "means for" or "step for" language being explicitly recited in the claim(s).

Upon reading this disclosure, those of ordinary skill in the art will appreciate still additional alternative structural and functional designs for providing an interface to streamline a user's experience with a vehicle sharing application through the disclosed principles herein. Thus, while particular aspects and applications have been illustrated and described, it is to be understood that the disclosed aspects are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims. The methods and processes described throughout the present disclosure may be utilized to prepopulate prompts, eliminate prompts, and otherwise streamline a user's experience.

We claim:

1. A computer-implemented method of predicting a user preference, comprising:

generating, by one or more processors, a first graphic user interface (GUI), including a first set of prompts, for display via a vehicle-sharing application associated with a vehicle-sharing platform profile of a vehicle owner;

causing, by the one or more processors, the first GUI to be displayed via the vehicle-sharing application;

receiving, by the one or more processors, from the vehicle owner and via the first GUI, a first set of answers to the first set of prompts;

generating, by the one or more processors and based on the first set of answers, a second GUI, including a second set of prompts, for display via the vehicle-sharing application;

causing, by the one or more processors, the second GUI to be displayed via the vehicle-sharing application;

determining, by the one or more processors and using the first set of answers, user preference values;

receiving, by the one or more processors, from the vehicle owner and via the second GUI, a second set of answers to the second set of prompts;

receiving, by the one or more processors, telematics data from a vehicle of the vehicle owner, the telematics data indicating driving behavior of the vehicle owner;

determining, by the one or more processors executing a machine learning model using the second set of answers and the telematics data, one or more user preference values that define one or more criteria to share a vehicle associated with the vehicle-sharing platform profile, wherein the one or more criteria are unique to the vehicle owner;

training, the machine learning model to identify patterns between the telematics data and the one or more user preference values;

determining, by the one or more processors and based on the one or more criteria, one or more potential vehicle renters from a plurality of potential vehicle renters who satisfy the one or more criteria;

mapping, by the one or more processors, the one or more user preference values to settings of one or more graphical filters for display via the vehicle-sharing application, wherein a modification to at least one of the settings causes a change to a corresponding at least one of the one or more user preference values; and causing, by the one or more processors, the graphical filter and an indication of the vehicle to be displayed via the vehicle-sharing application to the one or more potential vehicle renters.

2. The computer-implemented method of claim 1, further comprising:
causing, by the one or more processors, the one or more user preference values to be displayed via the vehicle-sharing application.

3. The computer-implemented method of claim 2, further comprising:
generating, by the one or more processors, a third GUI including a third set of prompts, wherein the third set of prompts request the vehicle owner to confirm the one or more user preference values; and
causing, by the one or more processors, the third GUI to be displayed via the vehicle-sharing application.

4. The computer-implemented method of claim 1, further comprising:
modifying, by the one or more processors, the one or more user preference values based on a user input received via the vehicle-sharing application from the vehicle owner.

5. The computer-implemented method of claim 1, wherein the first set of prompts is accompanied with answer choices derived from historical data associated with the vehicle owner.

6. The computer-implemented method of claim 1, wherein the first set of prompts is accompanied with default answer choices.

7. The computer-implemented method of claim 1, further comprising:
receiving, by the one or more processors, historical data associated with the one or more potential vehicle renters; and
determining, by the one or more processors, the one or more potential vehicle renters who satisfy the one or more criteria by comparing the historical data associated with the one or more potential vehicle renters with the one or more user preference values.

8. The computer-implemented method of claim 7, wherein the historical data comprises telematics data indicative of driving behavior of the one or more potential vehicle renters.

9. The computer-implemented method of claim 7, wherein historical data comprises rental evaluation data associated with the one or more potential vehicle renters upon completion of trips using vehicles shared by other vehicle owners.

10. A non-transitory computer-readable medium comprising computer-readable instructions that, when executed by one or more processors, cause the one or more processors to:
generate a first graphic user interface (GUI), including a first set of prompts for display via a vehicle-sharing application associated with a vehicle-sharing platform profile of a vehicle owner;
cause the first GUI to be displayed via the vehicle-sharing application;
receive, from the vehicle owner and via the first GUI, a first set of answers to the first set of prompts;
generate, based on the first set of answers, a second GUI including a second set of prompts, for display via the vehicle-sharing application;
cause the second GUI to be displayed via the vehicle-sharing application;
determine, using the first set of answers, user preference values;
receive, from the vehicle owner and via the second GUI, a second set of answers to the second set of prompts;
receive telematics data from a vehicle of the vehicle owner, the telematics data indicating driving behavior of the vehicle owner;
determine, by executing a machine learning model using the second set of answers and the telematics data, one or more user preference values that define one or more criteria to share a vehicle associated with the vehicle-sharing platform profile, wherein the one or more criteria are unique to the vehicle owner;
train the machine learning model to identify patterns between the telematics data and the one or more user preference values;
determine, based on the one or more criteria, one or more potential vehicle renters from a plurality of vehicle renters who satisfy the one or more criteria;
map the one or more user preference values to settings of one or more graphical filters for display via the vehicle-sharing application, wherein a modification to at least one of the settings causes a change to a corresponding at least one of the one or more user preference values; and
cause the graphical filter and an indication of the vehicle to be displayed via the vehicle-sharing application to the one or more potential vehicle renters.

11. The non-transitory computer-readable medium of claim 10, wherein the computer-readable instructions when executed by the one or more processors further cause the one or more processors to:
generate a third GUI including a third set of prompts for display via the vehicle-sharing application, wherein the third set of prompts request the vehicle owner to confirm the one or more user preference values; and
cause the third GUI to be displayed via the vehicle-sharing application.

12. The non-transitory computer-readable medium of claim 10, wherein the instructions when executed by the one or more processors further cause the one or more processors to:
modify the one or more user preference values based on a user input received via the vehicle-sharing application from the vehicle owner.

13. The non-transitory, computer-readable medium of claim 10, wherein the computer-readable instructions, when executed by the one or more processors, further cause the one or more processors to:
- receive historical data associated with the potential vehicle renters; and
- determine the one or more potential vehicle renters who satisfy the one or more criteria by comparing the historical data associated with the one or more potential vehicle renters with the one or more user preference values.

14. The non-transitory, computer-readable medium of claim 13, wherein the historical data comprises telematics data indicative of driving behavior of the potential vehicle renters.

15. The non-transitory, computer-readable medium of claim 13, wherein historical data comprises rental evaluation data associated with the potential vehicle renters upon completion of trips using vehicles shared by other vehicle owners.

16. A system, comprising:
- one or more processors; and
- one or more memories storing computer-executable instructions that, when executed by the one or more processors, cause the system to perform operations comprising:
  - generating a first graphic user interface (GUI), the first GUI including a first set of prompts for display via a vehicle-sharing application, wherein the vehicle sharing application is associated with a vehicle-sharing platform profile of a vehicle owner;
  - causing the first GUI to be displayed via the vehicle-sharing application;
  - receiving, from the vehicle owner and via the first GUI, a first set of answers to the first set of prompts;
  - generating, based on the first set of answers, a second GUI including a second set of prompts, for display via the vehicle-sharing application;
  - causing the second GUI to be displayed via the vehicle-sharing application;
  - determining, using the first set of answers, user preference values;
  - receiving, from the vehicle owner and via the second GUI, a second set of answers to the second set of prompts;
  - receiving telematics data from a vehicle of the vehicle owner, the telematics data indicating driving behavior of the vehicle owner;
  - determining, by executing a machine learning model, using the second set of answers and the telematics data, one or more user preference values that define one or more criteria to share a vehicle associated with the vehicle-sharing platform profile, wherein the one or more criteria are unique to the vehicle owner;
  - training the machine learning model to identify patterns between the telematics data and the one or more user preference values;
  - determining, based on the one or more criteria, one or more potential vehicle renters from a plurality of vehicle renters who satisfy the one or more criteria;
  - mapping the one or more user preference values to settings of one or more graphical filters for display via the vehicle-sharing application, wherein a modification to at least one of the settings causes a change to a corresponding at least one of the one or more user preference values; and
  - causing the graphical filter and an indication of the vehicle to be displayed via the vehicle-sharing application to the one or more potential vehicle renters.

* * * * *